(No Model.)

P. L. FOX.
SCAFFOLD BRACKET.

No. 542,469. Patented July 9, 1895.

WITNESSES
H. A. Lamb
S. V. Richardson

INVENTOR
Philo L. Fox
By A. M. Wooster
Atty

UNITED STATES PATENT OFFICE.

PHILO L. FOX, OF BRIDGEPORT, CONNECTICUT.

SCAFFOLD-BRACKET.

SPECIFICATION forming part of Letters Patent No. 542,469, dated July 9, 1895.

Application filed May 16, 1895. Serial No. 549,576. (No model.)

*To all whom it may concern:*

Be it known that I, PHILO L. FOX, a citizen of the United States, residing at Bridgeport, in the county of Fairfield and State of Connecticut, have invented certain new and useful Improvements in Scaffold-Brackets; and I do hereby declare the following to be a full, clear, and exact description of the invention, such as will enable others skilled in the art to which it appertains to make and use the same.

My invention has for its object to provide a portable bracket for use in supporting builders' scaffolds and similar uses, especially scaffolds which are required to support heavy weights, as masons' scaffolds, in building large buildings; and it has for its object to produce a device of this class which shall be strong enough to support any possible weight that can be placed upon it, shall be inexpensive, easy to adjust, and which shall entirely do away with the use of ropes in attaching any of the supports of a scaffold in place.

With these ends in view I have devised the novel bracket of which the following description, in connection with the accompanying drawings, is a specification, numbers being used to designate the several parts.

Figure 1:
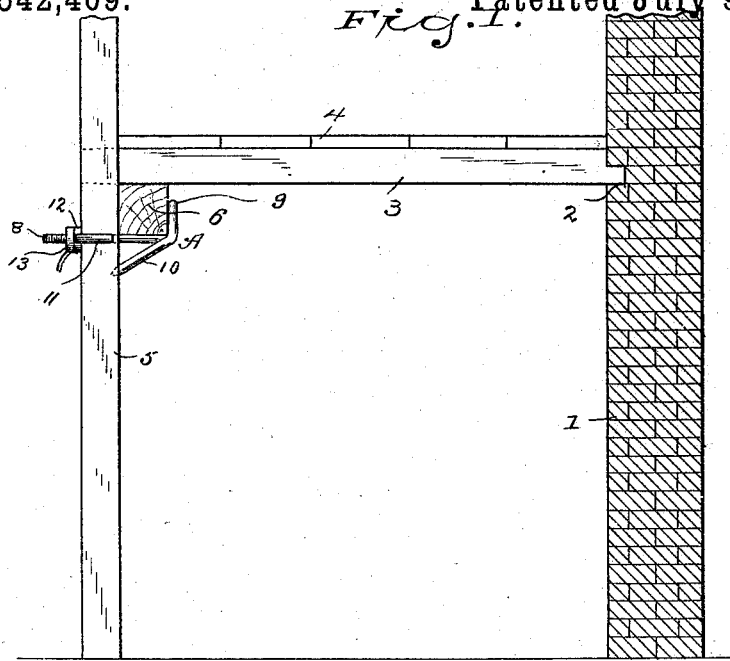
Figure 2:
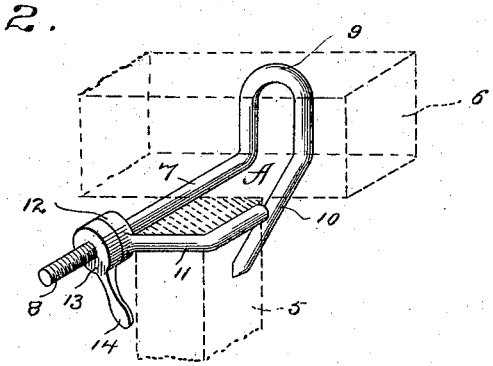
Figure 3:
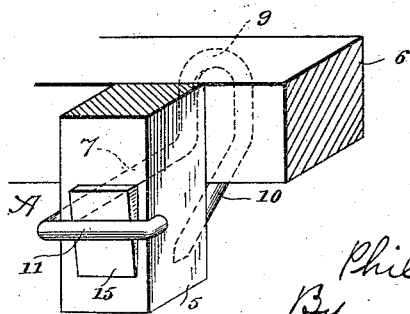

Figure 1 is a view of a section of a wall and a scaffold-pole, illustrating the use of one from of my novel bracket in supporting a scaffold; Fig. 2, a perspective of this form of bracket on an enlarged scale, the ledger appearing in dotted lines and the scaffold-pole in dotted lines and in section; and Fig. 3 is a perspective illustrating another form of my novel bracket, the ledger and the scaffold-pole appearing in full lines and the bracket partly in full lines and partly in dotted lines.

1 denotes a section of a wall of a building which is provided with the usual openings 2, one only being shown, to receive the ends of the string-pieces, or, as they are called by builders, "putlogs" 3, which support the planks of the scaffold, which I have indicated by 4.

5 is a scaffold-pole, and 6 the ledger which supports the outer ends of the putlogs and which has ordinarily heretofore been attached to the scaffold-pole by strong ropes.

A denotes my novel bracket as a whole, which is made of metal. This bracket may be made in one piece, as in Fig. 3, or it may be made in two pieces, as in Figs. 1 and 2, and locked in position by a nut. In the form illustrated in Figs. 1 and 2 the bracket consists of a shank 7, threaded at its outer end, as at 8, and provided with an end piece 9, formed by curving and recurving the metal of the bracket and adapted to lie on the inner side of the ledger, as clearly shown, and an angle-piece 10, which extends downward from the end piece in position to engage the scaffold-pole, the end thereof being preferably sharpened sufficiently to permit it to engage the scaffold-pole firmly.

11 denotes an angle-arm, which is adapted to lie on the outer face of the scaffold-pole and to partially inclose one of the sides thereof, and is provided with a head 12, through which the shank passes freely.

13 denotes a nut, which engages thread 8, and is preferably provided with a hand-piece 14 for convenience in use.

In the form illustrated in Fig. 3 end piece 9 and angle-piece 10 are the same as in the other form; but angle-arm 11 is made integral with the shank, the shank being bent at a right angle to form the base of the angle-piece and again at a right angle and parallel to the shank to form the outer end of the angle-arm. Thread 8, head 12, and nut 13 are wholly dispensed with in this form, the bracket being self-locking through the weight of the parts supported thereby.

The operation of either form of my novel bracket will be clearly understood from the drawings.

The scaffold-pole being in position, the bracket is placed at the required position thereon. The ledger is then placed between end piece 9 and the scaffold-pole, the weight of the ledger being supported by the shank, and the angle-piece of the bracket is firmly engaged with the scaffold-pole.

In using the form illustrated in Fig. 3 it is of course necessary to turn the bracket at an angle, so as to slip it over the scaffold-pole, it being obvious that there must be space enough between the outer end of the angle-arm and the tip of the angle-piece to permit the bracket to pass between them. For example, if the bracket is intended to be used upon a four-by-four scaffold-pole it would be necessary that the outer end of the angle-arm and the tip of the angle-piece should be fully four inches apart, so that when turned at an angle the bracket could be slipped over the pole. A wedge 15 may be used in connection with this form if preferred, said wedge being driven between the angle-arm and the scaffold-pole, as shown in the drawings, or it may be driven between the scaffold-pole and the ledger.

In using the form illustrated in Figs. 1 and 2 after the parts have been placed in position, as already described, the head of the arm is passed over the shank, the angle-arm lying, as before, on the outer side of the scaffold-pole and partially inclosing the side of the scaffold-pole opposite to the shank. Nut 13 is then screwed down hard, which clamps the ledger between the end piece and the scaffold-pole and forces the sharpened end of the angle-piece into the scaffold-pole.

Having thus described my invention, I claim—

1. A scaffold bracket consisting of a shank and an angle arm adapted to partially inclose a scaffold pole, an end piece adapted to lie on the side of the ledger opposite to the scaffold pole and an angle piece extending downward from the end piece in position to engage the scaffold pole.

2. The combination with a bracket consisting of a shank and an angle arm adapted to partially inclose a scaffold pole, an end piece adapted to lie on the side of the ledger opposite to the scaffold pole and an angle piece extending downward from the end piece in position to engage the scaffold pole, of means substantially as described and shown for clamping both the bracket and ledger to the scaffold pole.

3. A scaffold bracket consisting of a shank threaded at its outer end and having an end piece adapted to lie on the side of the ledger opposite to the scaffold pole and an angle piece extending downward from the end piece in position to engage the scaffold pole, an angle arm having a head adapted to pass over the shank, said arm being adapted to lie on the outer face of the scaffold pole and to partially inclose the side of the scaffold pole opposite to the shank and a nut engaging the shank whereby the bracket is clamped to the scaffold pole and the ledger is clamped between the end piece and the scaffold pole.

In testimony whereof I affix my signature in presence of two witnesses.

PHILO L. FOX.

Witnesses:
A. M. WOOSTER,
S. V. RICHARDSON.